United States Patent
Schillinger et al.

(10) Patent No.: US 11,257,214 B2
(45) Date of Patent: Feb. 22, 2022

(54) TWO-STAGE VARIATIONAL IMAGE SEGMENTATION OF MEDICAL IMAGES USING FRACTURE MECHANICS

(71) Applicant: REGENTS OF THE UNIVERSITY OF MINNESOTA, Minneapolis, MN (US)

(72) Inventors: Dominik Schillinger, Minneapolis, MN (US); Tarun Gangwar, Minneapolis, MN (US); Takashi Takahashi, Minneapolis, MN (US); Jeff Calder, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 55 days.

(21) Appl. No.: 16/701,562

(22) Filed: Dec. 3, 2019

(65) Prior Publication Data
US 2020/0175680 A1    Jun. 4, 2020

Related U.S. Application Data

(60) Provisional application No. 62/774,473, filed on Dec. 3, 2018.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10081* (2013.01); *G06T 2207/30008* (2013.01)

(58) Field of Classification Search
CPC ............... G06T 7/0012; G06T 7/11; G06T 2207/30008; G06T 2207/10081; G06T 2207/10116; G06T 2207/20116; G06T 7/149; G06T 2207/10088
See application file for complete search history.

(56) References Cited

U.S. PATENT DOCUMENTS

| | | |
|---|---|---|
| 2006/0056698 A1 | 3/2006 | Jolly et al. |
| 2014/0161334 A1 | 6/2014 | Wang et al. |
| 2016/0275674 A1 | 9/2016 | Rivet-Sabourin et al. |
| 2020/0041261 A1* | 2/2020 | Bernstein ........... A61B 1/00009 |

(Continued)

OTHER PUBLICATIONS

Nguyen, L..H. ("Phase-field boundary conditions for the voxel finite cell method: surface-free stress analysis of CT-based bone structures") International Jounral for Numerical Methods in Biomedical Engineering. Mar. 2017. (Year: 2017).*

(Continued)

*Primary Examiner* — Kim Y Vu
*Assistant Examiner* — Molly Delaney
(74) *Attorney, Agent, or Firm* — Quarles & Brady LLP

(57) ABSTRACT

Systems and methods are described for segmenting a medical image using a two-stage variational method in which fracture mechanics are used in the second stage to remove fine-scale contact bridges that connect object contours generated in the first stage. The image segmentation can be used to segment objects, such as bone objects, from surrounding tissues in a medical image, such as an image obtained with a computed tomography ("CT") or other x-ray imaging system.

17 Claims, 11 Drawing Sheets

(56) References Cited

U.S. PATENT DOCUMENTS

2020/0226831 A1* 7/2020 Su .......................... G06T 7/251

OTHER PUBLICATIONS

Miehe et al., A Phase Field Model for Rate-Independent Crack Propagation: Robust Algorithmic Implementation Based on Operator Splits, Computer Methods in Applied Mechanics and Engineering, 2010, 199:2765-2778.
Yokota et al., Automated Segmentation of the Femur and Pelvis from 3D CT Data of Diseased Hip Using Hierarchical Statistical Shape Model of Joint Structure, In International Conference on Medical Image Computing and Computer-Assisted Intervention, 2009, pp. 811-818.
Yang et al., Automatic Bone Segmentation and Bone-Cartilage Interface Extraction for the Shoulder Joint from Magnetic Resonance Images, Physics in Medicine & Biology, 2015, 60(4):1441-1459.
Zhang et al., Fast Segmentation of Bone in CT Images Using 3D Adaptive Thresholding, Computers in Biology and Medicine, 2010, 40(2):231-236.
Borden et al., A Phase-Field Description of Dynamic Brittle Fracture, Computer Methods in Applied Mechanics and Engineering, 2012, 217:77-95.
Bourdin et al., The Variational Approach to Fracture, Journal of Elasticity, 2008, 91(1):5-148.
Calder et al., A Variational Approach to Bone Segmentation in CT Images, In Medical Imaging 2011: Image Processing, vol. 7962, p. 79620B, International Society for Optics and Photonics, 2011.
Francfort et al., Revisiting Brittle Fracture as an Energy Minimization Problem, Journal of the Mechanics and Physics of Solids, 1998, 46(8): 1319-1342.
Gangwar et al., Robust Variational Segmentation of 3D Bone CT Data with Thin Cartilage Interfaces, Medical Image Analysis, 2018, 47:95-110.
Schillinger et al., Isogeometric Collocation for Phase-Field Fracture Models, Computer Methods in Applied Mechanics and Engineering, 2015, 284:583-610.
Xia et al., Automated Bone Segmentation from Large Field of View 3D Mr Images of the Hip Joint, Physics in Medicine & Biology, 2013, 58(20)7375-7390.

* cited by examiner

TWO-STAGE VARIATIONAL IMAGE SEGMENTATION OF MEDICAL IMAGES USING FRACTURE MECHANICS

CROSS-REFERENCE TO RELATED APPLICATIONS

This application claims the benefit of U.S. Provisional Patent Application Ser. No. 62/774,473, filed on Dec. 3, 2018, and entitled "TWO-STAGE VARIATIONAL IMAGE SEGMENTATION OF MEDICAL IMAGES USING FRACTURE MECHANICS," which is herein incorporated by reference in its entirety.

BACKGROUND

Robust, accurate, and fully automated segmentation of medical images (e.g., 2D or 3D medical images) constitutes a challenge in medical image analysis. The segmentation methodologies most widely used in applications usually emphasize accuracy and robustness at the cost of automation. As a consequence, segmentation procedures in clinical practice and biomedical research still largely rely on the supervision and manual intervention of segmentation experts.

In the context of physiology-based modeling and simulation, using a variational approach to segmentation is particularly attractive, as both approaches can be based on a common variational framework. For instance, the same numerical discretization method can be used to find solutions to the underlying partial differential equations. Variational segmentation methods are based on finding the minimizing function of an energy-type functional whose contour represents the boundaries of segmented objects to be identified. Suitable energy functionals can flexibly incorporate edge based local information, region based global information, or any other a priori knowledge about the target segmentation region.

Parametric active contour models initialize a parametric contour surface and energy minimization moves the parametric representation towards the boundaries of the segmentation region. Geometric deformable models develop a segmentation by evolving implicit contour functions that are independent of any parametrization. Level set methods form the basic numerical framework for the solution of these models.

The presence of thin interfaces between different objects in practical medical image representations, usually coupled with limited resolution and fuzzy color information, is a major challenge for segmentation methodologies. It can be difficult to automatically segmenting bone objects that are separated by thin cartilage interfaces from 3D CT scans.

One example is segmentation of the femur, which requires detecting the thin cartilage layer at the hip joint to establish a clean separation from the pelvis. Prior work on this problem has mostly focused on non-variational segmentation methods. To address this problem, methods for improving thresholding techniques based on tensor-based filters or methods based on 3D correlation between bone objects have been proposed. Another approach is to integrate a priori geometric information, for example the close similarity of the femoral head with a perfect sphere. Significant attention has also been devoted to statistical shape models that separate the femur and pelvis by determining the significant mode of variations from sets of training data.

Despite these approaches, there remains a need to provide a robust, accurate, and automatic method for segmenting objects that are separated by a thin interface, such as bone objects separated by cartilage, from medical images.

SUMMARY OF THE DISCLOSURE

The present disclosure addresses the aforementioned drawbacks by providing a method for segmenting a medical image. A medical image is provided to a computer system and an object contour having a first contour and a second contour is generated by minimizing a functional based in part on an implicit geometric deformable model and where the medical image is input to the functional. The first contour and the second contour are connected by at least one contact bridge. A phase-field fracture function that removes the at least one contact bridge to separate the first contour and the second contour is computed by minimizing an energy functional, wherein the object contour is input to the energy functional. A segmentation mask is generated using the phase-field fracture function, and a segmented image that depicts the object is produced by applying the segmentation mask to the medical image.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1A:
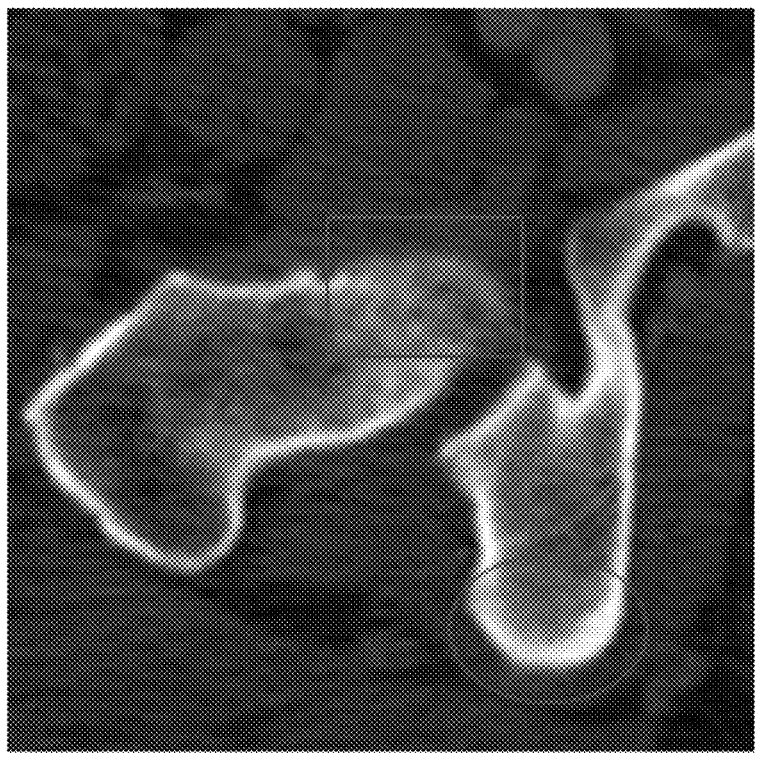
FIG. 1A is an example of a computed tomography ("CT") image depicting a femur and a pelvis, in which the femur and pelvis are well separated.

Described here are systems and methods for segmenting a medical image using a two-stage variational method in which fracture mechanics are used in the second stage to remove fine-scale contact bridges that connect object contours generated in the first stage. The methods described in the present disclosure can be used to segment objects, such as bone objects, from surrounding tissues in a medical image, such as an image obtained with a computed tomography ("CT") or other x-ray imaging system. In other embodiments, the medical image can be obtained with an imaging modality other than CT or x-ray imaging, such as magnetic resonance imaging ("MRI"). The methods described in the present disclosure can also be used to segment other objects from surrounding tissues, such as implanted medical devices.

As one non-limiting example, the methods described in the present disclosure can be used for the segmentation of 3D bone CT data. The methods are accurate, perform robustly with respect to thin cartilage interfaces, and can be integrated with downstream predictive bone modeling and simulation methods in a common finite element framework.

The methods described in the present disclosure generally include using a two-stage segmentation procedure that leverages variational image segmentation of objects, such as bone structures, with geometric deformable models.

In the first stage, an object contour is computed, where the contour that well separates parts of the bone, or other, objects within the image. As one non-limiting example described in more detail below, a flux-augmented two-phase Chan-Vese model can be used to compute the contours for all bone objects in the image.

In the second stage, a phase-field fracture-based technique is used to reliably eliminate all spurious contact bridges across contoured bone, or other, objects. For instance, this process can be used to eliminate contact bridges across thin cartilage interfaces between contoured bone objects. The result of this second stage of processing is an accurate segmentation topology, where the segmentation region of each individual bone object can be easily identified.

As one example, the phase-field fracture-based processing can be implemented using a variational fracture based on the minimization of an energy functional, which can naturally fit with a variational-based image segmentation in the first stage, such as the minimization of a flux-augmented Chan-Vese functional.

As mentioned, the image segmentation methods described in the present disclosure generally include using a two-stage approach, in which a variational image segmentation stage is followed by a fracture-mechanics based technique for removing spurious contact bridges that remain between contoured objects. Such an approach is advantageous for segmenting bone objects in CT images, especially bone objects with thin cartilage interfaces.

An example of a flux-augmented Chan-Vese functional that can be used for the first stage of the image segmentation methods described in the present disclosure is now described. The flux-augmented Chan-Vese functional is but one example of a functional that can be implemented in the first stage of the two-stage variational image segmentation techniques described in the present disclosure.

The energy functional described here includes a minimizer that can extract bone geometry from imaging data, such as CT or magnetic resonance images. The contour solution reliably separates bone and surrounding tissue, but small spurious contacts can remain in the fine interface region between separate bone objects, which can be removed in the second stage described later.

Given a three-dimensional voxel (or a two-dimensional pixel) representation of an image over a domain, $\Omega$, such that its local intensity is given as, $I(x):\Omega \rightarrow [0,1]$, the first step of the variational image segmentation is based on an implicit geometric deformable model.

Implicit geometric deformable models can be based on simplified Mumford-Shah invariants that enable a robust numerical treatment. One example of an implicit geometric deformable model is the Chan-Vese active contour model without edges. It will be appreciated by those skilled in the art, however, that other implicit geometric deformable models can also be used. The Chan-Vese model assumes that two regions $\Omega_1(C)$ and $\Omega_2(C)$ with approximately piecewise constant intensities and which are separated by a deformable curve, $C$, can be identified. This assumption gives rise to the following two fitting terms:

$$F_1(C)+F_2(C):=\int_{\Omega_1}|I-c_1|^2 dx+\int_{\Omega_2}|I-c_2|^2 dx \qquad (1);$$

where $c_1$ and $c_2$ are defined as the average of the image intensity in $\Omega_1(C)$ and $\Omega_2(C)$, respectively. The curve, $C$, that minimizes the functional in Eqn. (1) represents the boundary of the object to be identified and can therefore be referred to as an object contour.

As one example, the unknown curve, $C$, can be represented as the zero isocontour of a deformable contour function. Adding a length penalty term and using the properties of the Heaviside function, $H$, the functional in Eqn. (1) can be rewritten in terms of $\phi$ into the following Chan-Vese energy functional:

$$F_{CV}(c_1,c_2,\phi):=\int |\nabla H(\phi)|+\lambda\{H(\phi)(I-c_1)^2+(1-H(\phi))(I-c_2)^2\}d\Omega \qquad (2);$$

with $$c_1 = \frac{\int_\Omega H(\phi)I d\Omega}{\int_\Omega H(\phi)d\Omega}$$

and $$c_2 = \frac{\int_\Omega (1-H(\phi))I d\Omega}{\int_\Omega (1-H(\phi))d\Omega}$$

where $\lambda \geq 0$ is a weighting coefficient. The corresponding Euler-Lagrange equation for the contour function, $\phi$, yields the following strong form gradient descent partial differential equation:

$$\frac{\partial \phi}{\partial t} = |\nabla \phi| \left\{ \nabla \cdot \left( \frac{\nabla \phi}{|\nabla \phi|} \right) - \lambda \{ (I - c_1)^2 - (I - c_2)^2 \} \right\}. \quad (3)$$

For the evolution of the contour function, $\phi$, in Eqn. (3), its curvature, $\kappa$, may be represented as, $$\kappa = \nabla \cdot \left( \frac{\nabla \phi}{|\nabla \phi|} \right). \quad (4)$$

This term can lead to Hamilton-Jacobi type equations, for which finite difference schemes such as fast marching methods can be implemented.

The curvature in Eqn. (3) can be more efficiently addressed using an Allen-Cahn energy functional. The Allen-Cahn energy functional and its corresponding partial differential equation can be expressed as follows:

$$F_{AC}(u) = \int_\Omega \left( \frac{\varepsilon^2}{2} |\nabla u|^2 + W(u) \right) d\Omega; \quad (5)$$

$$\frac{\partial u}{\partial t} = \varepsilon^2 \Delta u - W'(u). \quad (6)$$

For a double-well potential, $$W(\xi) = \frac{1}{4} \xi^2 (1 - \xi)^2 \quad (7);$$

the phase-field contour solution, u, is either zero or one, separated by a diffuse interface region where the solution rapidly changes between zero and one. The parameter $\varepsilon$ in Eqns. (5) and (6) controls the characteristic length-scale of the diffuse interface region. Using this formulation, the unknown curve, C, that defines the segmentation region can be represented as the isocontour, $u=0.5$.

Phase-field formulations based on the Allen-Cahn equation share many features with deformable active contour models, based on the analogy between mean curvature flow expressed in terms of a contour gradient as in Eqn. (4) and its regularization in terms of the Allen-Cahn equation. For sufficiently small values of $\varepsilon$, the Allen-Cahn formulation yields motion by mean curvature of the interface that separates the zero and one regions of the solution.

The curvature term of Eqn. (4) in the Chan-Vese energy functional of Eqn. (3) can be replaced by the computationally more tractable terms of the Allen-Cahn energy functional of Eqn. (5). The result of this substitution is a diffuse two-phase Chan-Vese model described by the following energy functional:

$$F^\varepsilon_{CV}(u, c_1, c_2) := \int_\Omega \frac{\varepsilon^2}{2} |\nabla u|^2 + \quad (8)$$
$$W(u) + \lambda \{ u^2 (I - c_1)^2 + (1 - u)^2 (I - c_2)^2 \} dx.$$

The phase-field formulation in Eqn. (8) leads to a variational form that can be robustly solved with finite element methods. Its variation with respect to the phase-field contour solution, u, gives the following strong form gradient descent partial differential equation:

$$\frac{\partial u}{\partial t} = \varepsilon^2 \Delta u - W'(u) - 2\lambda \{ u(I - c_1)^2 + (u - 1)(I - c_2)^2 \}. \quad (9)$$

The functional in Eqn. (8) represents a global measure of the characteristics of the segmentation region. Segmentation regions in bone CT scans and other medical images can, however, often have non-negligible image intensity boundaries where the intensity gradient vector field is pointing inwards. To leverage this observation for image segmentation, a flux augmentation to Eqn. (8) that incorporates a local measure of region boundaries in the image can be used. As an example, the following flux term can be used:

$$F_{flux} := -\oint \nabla I \cdot n \, ds \quad (10);$$

where the integration is performed over the isocontour representing the segmentation curve, C, which may be the isocontour $u=0.5$. The vector, n, is the unit inward normal to the curve, and $\nabla I$ is the gradient of the image intensity function. Adding the flux augmentation of Eqn. (10) to the functional of Eqn. (8), the following energy functional that can be used for the first stage of the image segmentation:

$$F^\varepsilon_{flux}(u, c_1, c_2) := \int_\Omega \frac{\varepsilon^2}{2} |\nabla u|^2 + W(u) + \quad (11)$$
$$\lambda \{ u^2 (I - c_1)^2 (I - c_2)^2 \} d\Omega - \mu \oint \nabla I \cdot n \, ds.$$

with $$c_1 = \frac{\int_\Omega u I d\Omega}{\int_\Omega u d\Omega};$$

and $$c_2 = \frac{\int_\Omega (1 - u) I d\Omega}{\int_\Omega (1 - u) d\Omega};$$

where $\mu \geq 0$ is a weighting coefficient. The corresponding gradient descent equation is, $$\frac{\partial u}{\partial t} = \varepsilon^2 \Delta u - W'(u) - 2\lambda \{ u(I - c_1)^2 + (u - 1)(I - c_2)^2 \} - \mu \Delta I. \quad (12)$$

The formulation in Eqns. (11) and (12) can be transferred into a variational format suitable for discretization with standard finite elements. In the context of image analysis, voxel finite element methods that associate each three-dimensional voxel with one linear hexahedral element provide the advantage that their approximation power directly corresponds to the available image resolution. However, triangular, quadrilateral, tetrahedral, or other shaped voxel finite elements can also be used. Discrete image representations are advantageous because they provide a finite element mesh, meaning that voxel finite element methods do not require additional meshing procedures.

Multiplying the gradient descent equation of Eqn. (12) with a test function, v, integrating over the image domain, $\Omega$, and applying integration by parts to all terms that involve the Laplace operator results in the following variational formulation:

Find $u_h \subset H^1(\Omega)$ such that, $$\left(\frac{\partial u_h}{\partial t}, v_h\right) + \varepsilon^2(\nabla u_h, \nabla v_h) + (W'(u_h), v_h) + \qquad (13)$$
$$2\lambda(u_h\{(I-c_1)^2\}, v_h) - 2\lambda((I-c_2)^2, v_h) + \alpha(\Delta I, v_h) = 0$$
$$\forall v_h \subset H^1(\Omega);$$

where it is assumed that the functions $c_1(u)$ and $c_2(u)$ are known at any given point in time. The first and second derivatives in the term $\Delta I$ can be evaluated by standard finite difference stencils on the center points of the structured voxel grid.

The variational form in Eqn. (13) can then be discretized in time. As an example, it can be discretized in time with the following first order semi-implicit finite difference scheme:
Find $u_h \subset H^1(\Omega)$ such that, $$\frac{1}{\Delta t}(u_h^{n+1} - u_h^n, v_h) + \varepsilon^2(\nabla u_h^{n+1}, \nabla v_h) + \qquad (14)$$
$$(W'(u_h^n), v_h) + 2\lambda(u_h^{n+1}\{(I-c_1^n)^2 + (I-c_2^n)^2\}, v_h) -$$
$$2\lambda((I-c_2^n)^2, v_h) + \alpha(\Delta I, v_h) = 0$$
$$\forall v_h \subset H^1(\Omega);$$

where linear and nonlinear expressions are evaluated implicitly and explicitly, respectively.

Figure 1B:
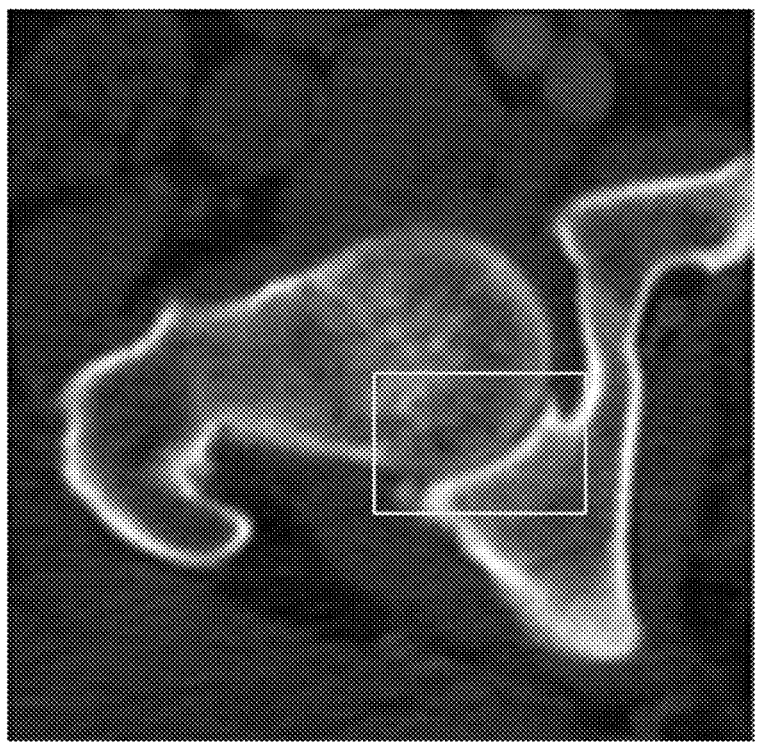
FIG. 1B is an example of a CT image depicting a femur and a pelvis, in which the femur and pelvis are not well separated because of a thin cartilage layer between the two bone objects.

Consider the two simple two-dimensional model problems shown in FIG. 1A and FIG. 1B. Each of FIGS. 1A and 1B depicts a slice from a CT scan of the femur and pelvis, and each exhibit typical features of bone CT scans. The coarse-scale bone objects can be easily distinguished from the surrounding soft tissue due to the bright cortical shell region near the bone boundaries and the light gray textured cancellous part in the bone interior regions. In FIG. 1A, the two-dimensional femur and pelvis regions are well separated. In FIG. 1B, however, the two bone regions are only separated by a thin, fine-scale sliver of cartilage in the hip joint whose thickness is resolved by just a few pixels.

Figure 2A:
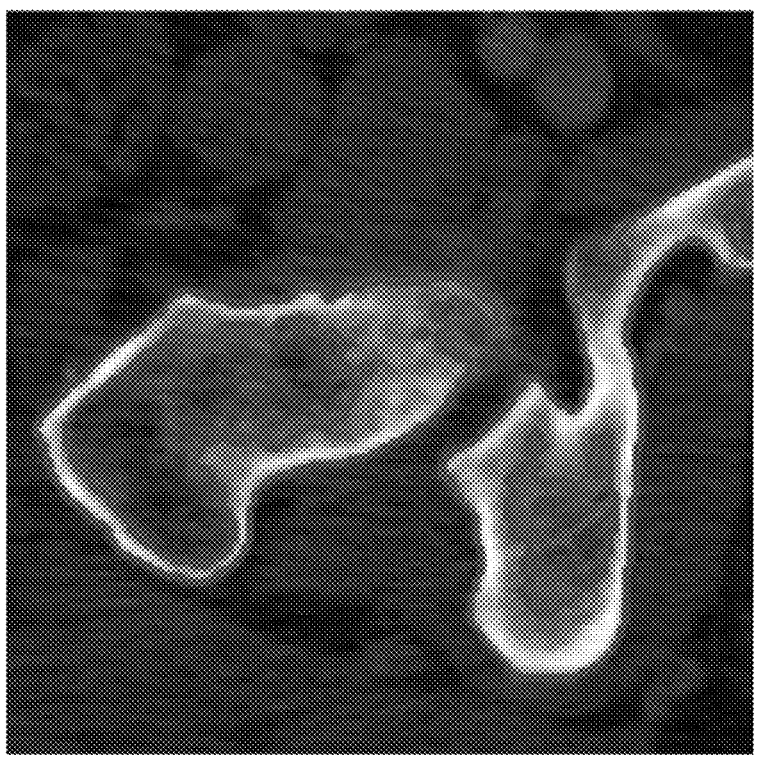
FIG. 2A is an example of an object contour generated from the image in FIG. 1A, in which the object contour includes two well-separated contours.
Figure 2B:
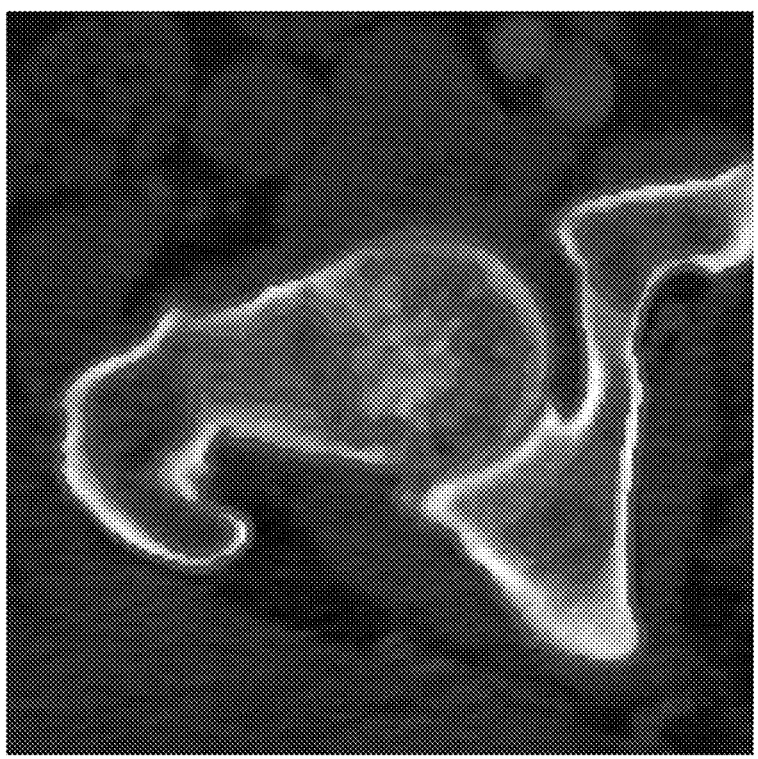
FIG. 2B is an example of an object contour generated from the image in FIG. 1B, in which the object contour includes two contours that are connected because of poor segmentation of the thin cartilage region between the bone objects.

These two example slices can be used to demonstrate the performance of image segmentation based on the functionals discussed above. Each image has a resolution of 140×140 pixels. The weak form of each variational problem is discretized by two triangular finite elements per pixel and the finite difference time discretization is solved until the steady state is reached. FIGS. 2A and 2B illustrate the results obtained with the basic two-phase Chan-Vese model of Eqn. (8) by plotting the segmentation contour, u=0.5, in red over the images. The model in Eqn. (8) works well for the slice in FIG. 1A where the two bone sections were well separated, as shown in FIG. 2A. For the slice in FIG. 1B where the thin cartilage separation exists between the two bone objects, however, the model in Eqn. (8) does not completely resolve the two sections, integrating the femur and pelvis regions as shown in FIG. 2B.

Figure 3:
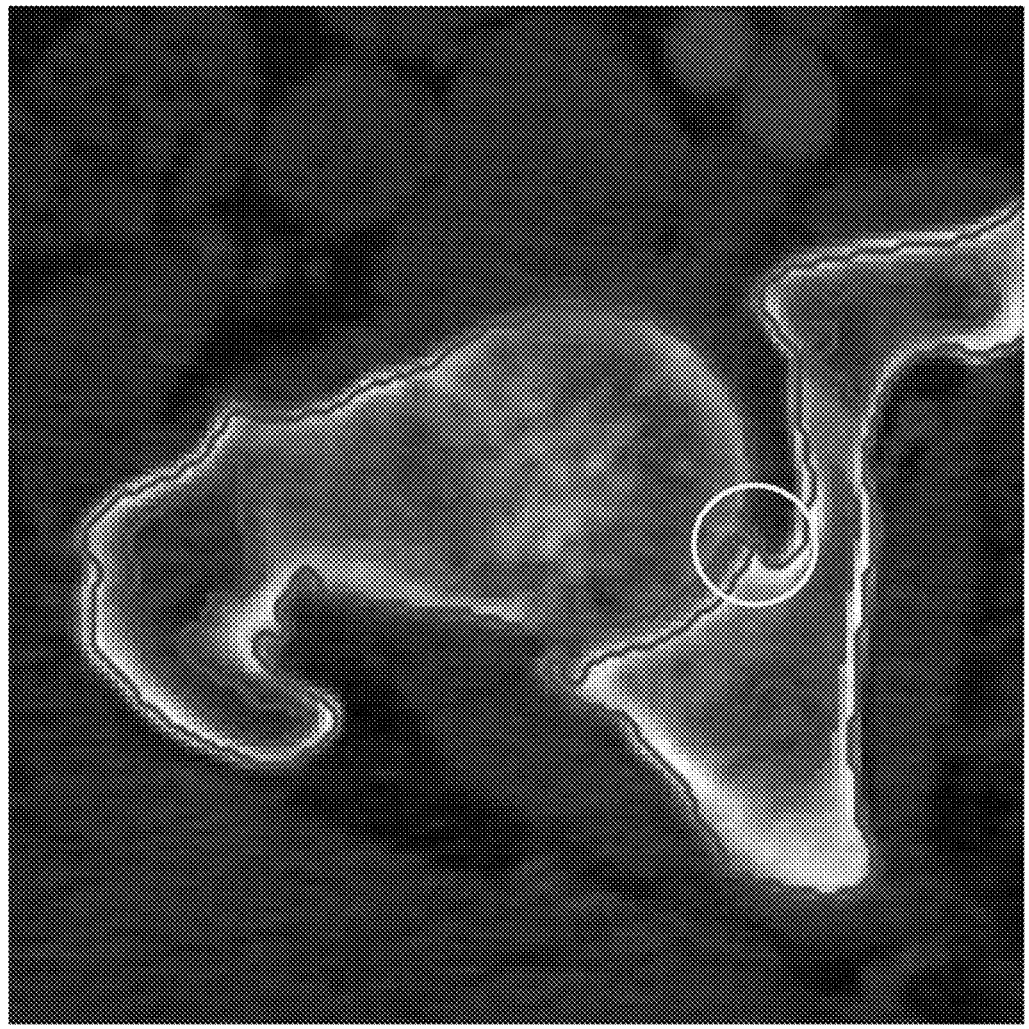
FIG. 3 is an example of an object contour generated from the image in FIG. 1B using a flux-augmented Chan-Vese functional, in which the object contour includes two contours that are connected by a fine-scale contact bridge existing in the thin cartilage region between the bone objects.

FIG. 3 illustrates an example result obtained with the flux-augmented diffuse two-phase Chan-Vese model of Eqn. (11) as applied to the image in FIG. 1B. The flux-augmented model is able to more reliably separate the two bone regions.

In particular, the flux-augmented model detects the thin cartilage region because the model incorporates local information based on the flux augmentation in Eqn. (10). However, small bridges between the femur and pelvis sections still remain, as shown in the circled region in FIG. 3. These contact bridges between the contoured bone objects can be easily detected through visual inspection and removed manually by a user, but this precludes an automated image segmentation process and workflow.

Thus, as mentioned, the image segmentation methods described in the present disclosure implement a second stage of image segmentation in which fine-scale contact bridges between contoured objects, such as those fine-scale contacts in cartilage regions between bone objects, can be removed.

Figure 4A:
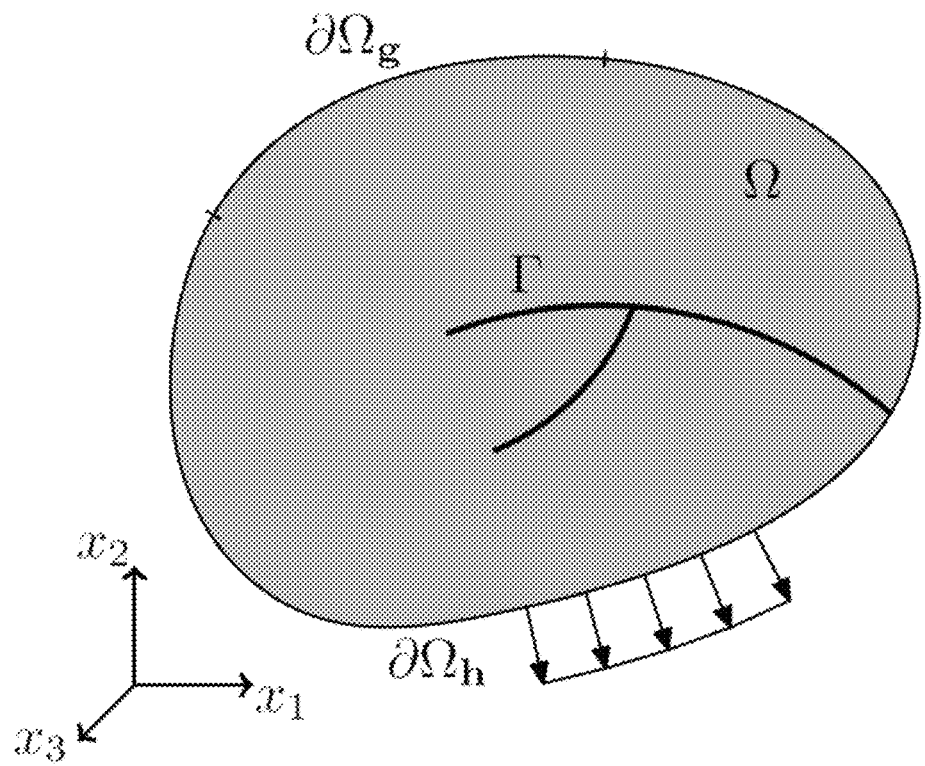
FIG. 4A depicts an example body, $\Omega$, with an internal discontinuity boundary, $\Gamma$, that represents a crack.

Considering an arbitrary body $\Omega \subset \mathbb{R}^d$ with $d \in \{1;2;3\}$ that has an external boundary $\partial\Omega$ and internal displacement discontinuity, $\Gamma$, as illustrated in FIG. 4A, the symmetric strain tensor can be given as, $$\varepsilon = \tfrac{1}{2}(\nabla u + \nabla u^T) \qquad (15);$$

where $u(x,t)$ denotes the displacement at each material point, $x$. The elastic energy stored in the bulk of the solid per unit volume is described by the following energy density function:

$$\psi_0(\varepsilon) = \tfrac{1}{2}\lambda_e tr(\varepsilon)^2 + \mu_e \varepsilon : \varepsilon \qquad (16);$$

where $\lambda_e$ and $\mu_e$ are the Lamé constants of elasticity. The evolving internal discontinuity boundary, $\Gamma(t)$, represents a set of discrete cracks. Describing the work required to create a unit area of fracture surface as equal to the critical energy release rate, $G_c$, the total internal potential of the body can be given by the following functional:

$$F_{pot}(\varepsilon, \Gamma) = \int_\Omega \psi_0(\varepsilon) d\Omega + \int_\Gamma G_c d\Gamma \qquad (17).$$

The first term in Eqn. (17) represents the energy stored in the bulk of the elastic solid, and the second term in Eqn. (17) represents the work necessary to create the current fracture topology, $\Gamma(t)$. The variational approach to fracture predicts the nucleation, propagation, and interaction of cracks by finding a global minimizer of Eqn. (17) for a given load.

To solve this variational problem numerically, a volumetric approximation to the surface integral can be used, $$\int_\Gamma G_c d\Gamma \approx \int_\Omega G_c \gamma_c d\Omega \qquad (18).$$

Figure 4B:
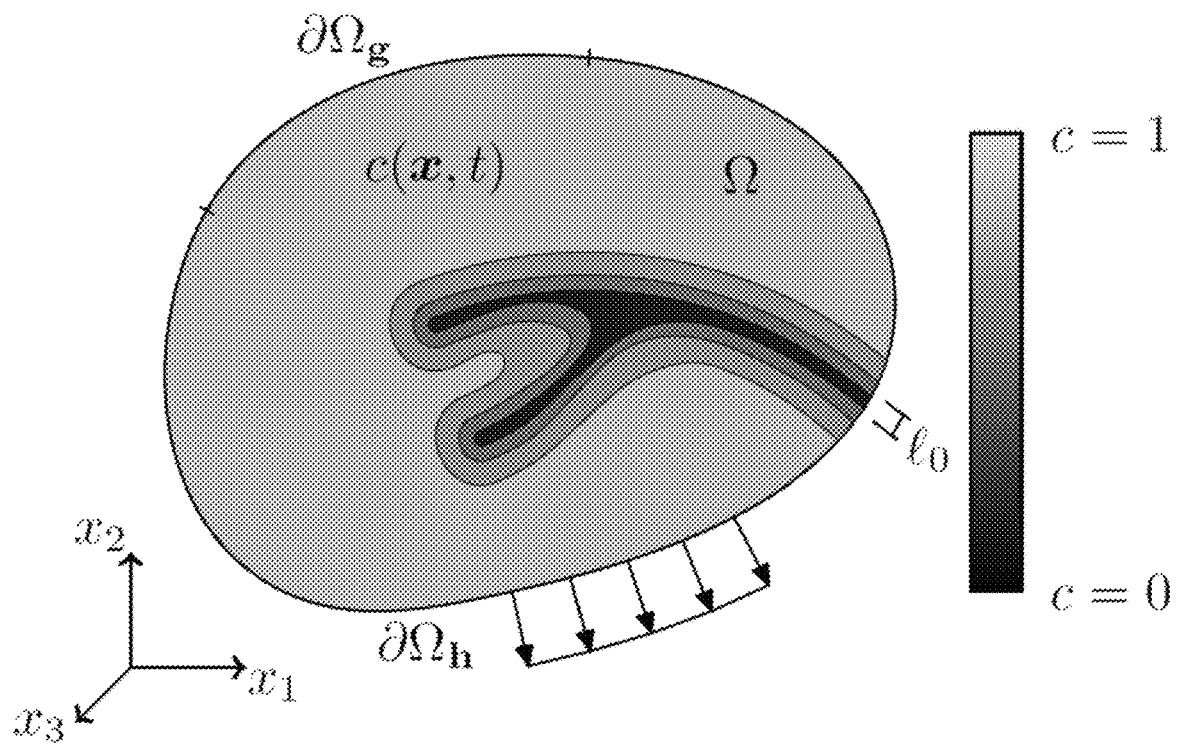
FIG. 4B depicts a phase-field approximation of the internal discontinuity, $\Gamma$, in FIG. 4A, where the parameter $l_0$ controls the diffusive fracture width.

This approximation uses a smooth scalar-valued phase-field, $c \in [0;1]$, to represent the crack. The phase-field has a value of one away from the crack and a value of zero at the crack, as shown in FIG. 4B. The phase-field approximation introduces a second-order crack density function, $$\gamma_c = \frac{1}{4l_0}((c-1)^2 + 4l_0^2|\nabla c|^2); \qquad (19)$$

whose characteristic interface width is controlled by a length-scale parameter, $l_0$.

The reference energy density function associated with the undamaged elastic solid (e.g., Eqn. (16)) can be multiplied with the phase-field to yield the following:

$$\tilde{\psi}(\varepsilon, c) = ((1-\kappa)c^2 = \kappa)\psi_0(\varepsilon) \qquad (20).$$

From a physical point of view, the phase-field locally penalizes the capability of the material to carry stress across cracks. The model parameter $\kappa \ll 1$ in Eqn. (20) prevents the full degradation of the stored energy by maintaining a small artificial tensile energy density, $\kappa\psi_0$, at the fully-broken state, $c=0$.

The variational form of the phase-field fracture problem can be derived from an incremental variational principle that balances the rate of different energy terms. In the quasi-static, the rate of the stored energy, $\dot{E}_{int}$; the rate of dissipated energy due to the work done by fracture, $\dot{F}_{frac}$; and the rate of the energy due to the work of external forces, $\dot{P}_{ext}$, are balanced. The balance of these energy terms leads to the following rate of energy functional:

$$\dot{E}_{int}+\dot{F}_{frac}-\dot{P}_{ext}=0 \qquad (21);$$

The rate of the stored energy can be computed from the stored energy function in Eqn. (20) as, $$\dot{E}_{int} = \frac{d}{dt}\int \tilde{\psi}d\Omega = \int \sigma\colon \dot{\varepsilon}d\Omega + \int 2(1-\kappa)\psi_0 c\dot{c}d\Omega; \qquad (22)$$

where the stress tensor, $\sigma$, can be computed from Eqn. (20) as, $$\sigma:=\partial_\varepsilon\tilde{\psi}(\varepsilon)_0=((1-\kappa)c^2+\kappa)(\lambda_\varepsilon<tr(\varepsilon)>I+2\mu\varepsilon) \qquad (23).$$

The second term of Eqn. (22) contains the reference energy density function and describes the local intensity of the deformation. This term can be interpreted as an energetic force that drives the crack evolution. The irreversibility of the crack topology can be incorporated by introducing a local history field, $$H(x, t) = \max_{s\in[0;t]} \psi_0(\varepsilon(x, s)). \qquad (24)$$

This local history field records the maximum positive reference energy density that has occurred during quasi-static loading at a specific location, x, up to the current (pseudo-)time instant, t. Replacing $\psi_0$ with H in Eqn. (22) allows for the corresponding energy to be dissipated from the system such that it cannot be returned.

The rate of the dissipated energy due to work done by fracture follows with the phase-field approximation of the fracture topology in Eqn. (18) as, $$\dot{F}_{frac} = \frac{d}{dt}\int G_c\gamma_c d\Omega \qquad (25)$$
$$= \int \frac{G_c}{2l_0}(c-1)\dot{c}d\Omega + \int 2G_c l_0 \nabla_c(\dot{\nabla}c)d\Omega.$$

The rate of energy due to the work done by external forces is, $$P_{ext}=\int b\cdot\dot{u}d\Omega+\int t\cdot\dot{u}\partial\Omega \qquad (26);$$

where b and t denote body forces and boundary tractions, respectively.

With the argument that the balance in Eqn. (21) should hold for arbitrary $\dot{u}$ and $\dot{c}$, the rate of energy functional can be separated into a phase-field part and an elasticity part. Identifying $\dot{u}$ and $\dot{c}$ as test functions, w and q, the weak form of the phase-field fracture problem can be written as follows: Find $c \in H^1(\Omega)$ and $u \in H^1(\Omega)$ such that, $$\int_\Omega \left(\frac{4l_0(1-\kappa)\psi_0}{G_c}+1\right)cqd\Omega + \int_\Omega 4l_0^2\nabla c\cdot\nabla qd\Omega = \int_\Omega qd\Omega, \qquad (27)$$
$$\forall q\in H^1(\Omega);$$

$$\int_\Omega \sigma\colon \nabla w d\Omega = \int b\cdot w d\Omega + \int_\Omega t\cdot w d\partial\Omega, \forall w\in H^1(\Omega). \qquad (28)$$

Using the phase-field fracture inspired functionals described above, fine-scale contacts between object contours can be automatically detected and removed. For instance, fine-scale contacts due to thin cartilage regions between contoured bone objects can be automatically detected and removed from an existing contour function. The contact bridges, which are generally much smaller than the characteristic length scale of the contour objects, can be removed using a fracture mechanics approach.

Although other fracture mechanics based techniques can be implemented for removing the fine-scale contacts between object contours, the phase-field fracture based approach offers some advantages. As one example, the phase-field fracture formulation can handle complex crack patterns in three dimensions, where other computational fracture models may have difficulties.

As another example, the phase-field fracture formulation can be readily incorporated into a variational approach to image segmentation. For instance, both the variation image segmentation techniques described with respect to the first stage above and the phase-field fracture formulation share the concept of a diffuse phase-field solution controlled by a length-scale parameter that represents complex geometric features implicitly.

Having described a general phase-field fracture formulation above, a simplified formulation based on a Laplace problem is now also described. Referring to the image domain, $\Omega$, and the associated image intensity function, I, a scalar function, h, can be defined over $\Omega$ instead of the displacement vector function, u, described above.

Based on the results of the first stage of the image segmentation, it can be assumed that the contour solution, u, is known in the second stage. From the examples described above, the isocontour u=0.5 can in some instances represent the boundaries of the correct segmentation regions, except for small spurious bridges in thin cartilage regions between individual bone objects. This contour function can therefore be used to define an indicator function, $\alpha(u)$, as, $$\alpha(u)\begin{cases} 1.0, & \text{if } u \geq 0.5 \\ 0.0, & \text{if } u < 0.5 \end{cases}; \qquad (29)$$

which distinguishes the segmentation region $\alpha=1$ from the rest of the image domain, $\Omega$.

In analogy to the strain energy density function in Eqn. (16), the following energy density associated with the function, h, can be defined:

$$\psi_0(\nabla h)=\tfrac{1}{2}\alpha(u)(\nabla h)^2 \qquad (30).$$

Adding the indicator function, $\alpha$, allows for the extension of the problem definition to the complete domain $\Omega$, in a fictitious domain sense. The problem definition can thus be naturally restricted to the segmentation region again, when discretized in the weak form.

In analogy to the variational description of fracture in Eqn. (17) and its phase-field approximation in Eqn. (18), a potential energy functional for the modified scalar problem can be defined as, $$F_{pot}(\nabla h,c)=\int_\Omega \tilde{\psi}_0(\nabla h,c)d\Omega+\int_\Omega G_c\gamma_c d\Omega \qquad (31);$$

where the same crack density function, $\gamma_c$, as in Eqn. (19) can be used. The material parameter, $G_c$, can be used to tune the weighting between the bulk term and surface term. For instance, the material parameter can be kept to be $G_c>0$. In Eqn. (31), the energy density function is penalized by the phase-field, c, following the concept of energy degradation, $$\tilde{\psi}_0(\nabla,c)=((1-\kappa)c^2+\kappa)\tfrac{1}{2}\alpha(\nabla h)^2 \qquad (32);$$

where the parameter $\kappa\ll 1$ prevents full degradation. In contrast to the functionals discussed above, the minimizers of the potential energy functional in Eqn. (31) can be constrained by appropriate Dirichlet boundary conditions for h.

Following the concepts described above, the weak form of the modified coupled phase-field fracture problem can be described as follows:

Find $c \in H^1(\Omega)$ and $h \in H^1(\Omega)$ such that, $$\int_\Omega \left(\frac{4l_0(1-\kappa)}{G_c}H + 1\right)cq d\Omega + \int_\Omega 4l_0^2 \nabla c \cdot \nabla q d\Omega = \int_\Omega q d\Omega, \quad (33)$$

$$\forall q \in H^1(\Omega);$$

$$\int_\Omega ((1-\kappa)c^2 + \kappa)\alpha \nabla h \cdot \nabla w d\Omega = 0, \quad (34)$$

$$\forall w \in \{H^1(\Omega), w|_{\partial \tilde\Omega_D} = 0\};$$

where the definition of the Dirichlet boundary, $\partial\tilde\Omega_D$, is left as unspecified in Eqn. (34) for the time being. In analogy to Eqn. (24), the reference energy density function, $\psi_0$, can be replaced in Eqn. (33) with a history field, $$H(x, t) = \max_{s \in [0;t]} \psi_0(\nabla h(x, s)); \quad (35)$$

in order to dissipate fracture energy and prevent crack healing during quasi-static loading.

The variational problem in Eqns. (33) and (34) can be discretized with voxel finite elements. As one example, the variational problems can be discretized using one voxel finite element per voxel, where the voxel finite element can be a triangular, quadrilateral, tetrahedral, hexahedral, or other shaped voxel finite element. Because the part of the domain where the indicator function is zero is not of interest, in some instances all voxel elements with $\alpha(u)=0$ in the center can be removed from the discretization to form a subset of voxel finite elements that cover the voxels associated with the segmented region. In other instances, all of the voxel finite elements can be retained. It will be appreciated by those skilled in the art that other voxel-based schemes for discretizing the variational problems other than those explicitly mentioned here can also be reasonably implemented. For example, the higher-order voxel finite cell method can be used.

The remaining voxel finite elements form a modified discretization that covers all voxels associated with the segmented region, and can approximate the smooth contour solution, u, from the first stage of the image segmentation, such as the smooth contour solution of the flux-augmented Chan-Vese functional.

Based on this approximation, $\tilde\Omega$ can be defined as the domain covered by the voxel finite element discretization, enclosed by the set of boundary facets, $\partial\tilde\Omega$, which can be split into a Neumann part, $\partial\tilde\Omega_N$, and a Dirichlet part, $\partial\tilde\Omega_D$. The discretized weak form of the coupled phase-field problem can be formulated as:

Find $c_h \in H^1(\tilde\Omega)$ and $h_h \in H^1(\tilde\Omega)$ such that, $$\left(\left(\frac{4l_0(1-\kappa)}{G_c}H + 1\right)c_h, q_h\right) + (4l_0^2 \nabla c_h, \nabla q_h) - (1, q_h) = 0, \quad (36)$$

$$\forall q_h \subset H^1(\tilde\Omega);$$

$$(((1-\kappa)c^2 + \kappa)\alpha \nabla h_h, \nabla w_h) = 0, \quad (37)$$

$$\forall w_h \subset \{H^1(\tilde\Omega), w|_{\partial\tilde\Omega_D} = 0\}.$$

The strong form of the modified phase-field fracture problem on $\tilde\Omega$ can be found by going back to continuous functions c and h, taking into account that Eqns. (36) and (37) hold for arbitrary $q_h$ and $w_h$ and applying integration by parts, $$\begin{cases} \left(\frac{4l_0(1-\kappa)}{G_c}H + 1\right)c + 4l_0^2 \Delta c = 1 & \text{on } \tilde\Omega \\ \nabla c \cdot n = 0 & \text{on } \partial\tilde\Omega \\ ((1-\kappa)c^2 + \kappa)\Delta h = 0 & \text{on } \tilde\Omega \\ h = g & \text{on } \partial\tilde\Omega_D \\ \nabla h \cdot n = 0 & \text{on } \partial\tilde\Omega_N \end{cases} \quad (38)$$

The first two equations in Eqn. (38) represent the partial differential equation for the evolution of the phase-field and its zero-flux boundary condition, respectively. The phase-field evolution is driven by the history field. If H=0, then the phase-field solution is one everywhere. If H>0, then the phase-field solution, c(x), will have non-zero second derivatives in order to satisfy the partial differential equation. A large local value of the history field forces the phase-field solution to have large local gradients, forming a diffuse crack whose width is controlled by the length-scale parameter, $l_0$.

The third equation in Eqn. (38) is a scalar Laplace equation with a variable phase-field coefficient. It is complemented by zero-flux conditions at the Neumann boundary $\partial\tilde\Omega_N$ and non-zero Dirichlet conditions at the Dirichlet boundary $\partial\tilde\Omega_D$. The gradient, $\nabla h$, of the Laplace solution determines the local intensity of the history function, H, according to Eqns. (30) and (35). With appropriate Dirichlet boundary conditions, the gradient field, $\nabla h$, will naturally spike at the small contact bridges between different contoured objects (e.g., bone objects), since they are geometrically much finer than the objects themselves. This will initiate fracture at those locations, removing the spurious contact bridges from the segmentation region.

Advantageously, the Laplace-based formulation in Eqn. (38) has a smaller set of parameters as well as its reduced computational cost, since only two scalar functions need to be discretized instead of a scalar and a vector function, relative to the elasticity based phase-field fracture formulation described above.

As one example solution of the coupled system in Eqns. (36) and (37), a staggered solution algorithm based on operator splits can be implemented and adjusted as appropriate. In such an approach, the phase-field and Laplace parts can be considered independently, which leads to two well-defined sub-problems. The Dirichlet boundary conditions are incrementally increased from zero to their full value, g, over pseudo-time, t. As one example, the phase-field part is first solved to update the phase-field solution, c, and then the Laplace part that updates the Laplace solution, h, is solved. After these steps, the history field, H, that records the maximum reference energy density at each quadrature point is updated. The algorithm can be summarized as follows, The field variables $h_h^n$ and $c_h^n$, and the history field $H^n$ are known at the current time, $t^n$. Update incremental prescribed Dirichlet boundary values $g^{n+1}$ to the new time $t^{n+1}$.

1. Update phase-field variable $c_h$ (phase-field part):
   Solve linear system $K_{ij}^c c_j = F_i^c$ that evolves from Eqn. (36) at frozen $h_h$.
2. Update field variable $h_h$ (Laplace part):
   Solve linear system $K_{ij}^h c_j = F_i^h$ using Eqn. (37) at frozen $c_h$.
3. Update history field:
   Determine maximum reference energy density during loading history $$H^{n+1}(h_h^{n+1}) = \begin{cases} \psi_0(h_h^{n+1}) & \text{if } \psi_0(h_h^{n+1}) > H^n \\ H^n & \text{otherwise} \end{cases}$$

Update time variable $t^{n+1}$ to $t^n$ and proceed to next step by restarting this procedure.

The choice of Dirichlet boundary constraints on the Laplace solution, h, will influence the reliability of the phase-field fracture method. In general, it can be assumed that the number of contoured objects, such as the number of bone objects, to be segmented in a given image is known or can be readily determined. In addition, it can generally be assumed that a non-zero number of voxel facets on the boundary of each individual object (e.g., individual bone object) can be identified. Based on this information, the following set of Dirichlet boundary conditions can generally be chosen and imposed:

$$h = 1 \text{ on } \partial\tilde{\Omega}_{D,1} \quad (39)$$

$$h = 2 \text{ on } \partial\tilde{\Omega}_{D,2}$$

$$\vdots$$

$$h = n \text{ on } \partial\tilde{\Omega}_{D,n};$$

where $\partial\tilde{\Omega}_{D,i}$ denotes the boundary surface that includes the known voxel boundary facets of the $i^{th}$ object (e.g., the $i^{th}$ bone object).

During the quasi-static loading procedure, the boundary values at each Dirichlet boundary can be incrementally increased. Due to the zero-flux conditions at the remainder of the boundary, the solution h in the region of the $i^{th}$ object (e.g., the $i^{th}$ bone object) will tend towards the constant value, i. Before fractures occur, the instantaneous Laplace solution h in each contoured region (e.g., each bone region) is only disturbed where small bridges between the regions exist. This initiates sharp gradients in the solution h that drive the fracturing of fine-scale contacts. Once all bridges have been fully broken, the Laplace solution h can be multiplied with the phase-field solution c such that h is set to zero in the fully fractured contact regions. The resulting plateau function, $c(x) \cdot h(x)$, contains clear plateau regions with constant value, i, that indicate the $i^{th}$ object (e.g., the $i^{th}$ bone object). An overlay of the plateau function onto the original image, I, can yield a segmentation region for each individual object (e.g., bone object) in the image.

As described, the image segmentations of the present disclosure include two stages of segmentation. In the first stage objects, such as bone objects, are segmented from surrounding tissues based on an implicit geometric deformable model, such as one implemented with a Chan-Vese functional, which may be a flux-augmented Chan-Vese functional. In the second stage, spurious fine-scale bridges (e.g., fine-scale contact bridges in the cartilage region between bone objects) are automatically detected and removed using a method based on a phase-field fracture.

In some instances, the robustness and automation of these methods can be improved by using additional voxel-wise manipulations. As one example, before running the first stage, the original image intensities can be rescaled to the zero-one range (i.e., [0,1]) and all tissue related information can be set by a threshold to zero. Thresholding in this manner works well for CT images because the Hounsfield units ("HU") of a CT scan yield a pronounced contrast between soft tissue (e.g., blood, muscles) and bone. When other medical images are being segmented (e.g., images obtained with MRI) different rescaling and thresholding can be used.

As another example, after solving for the object contours in the first stage (e.g., after solving the flux-augmented Chan-Vese, or other suitable, functional), voxel connectivity information can be used to identify the largest connected network of voxels covered by the non-zero solution field, and any small regions unconnected to the main object can be removed.

As yet another example, after obtaining the plateau function, $c(x) \cdot h(x)$, all voids within the contoured object interior (e.g., within the bone interior) can be removed. As one example, the voids can be removed by applying a dilation filter, a flood filling algorithm, and an erosion filter. Removing these voids helps ensure that the segmentation masks fully cover each contoured object (e.g., each bone object).

Figure 5:
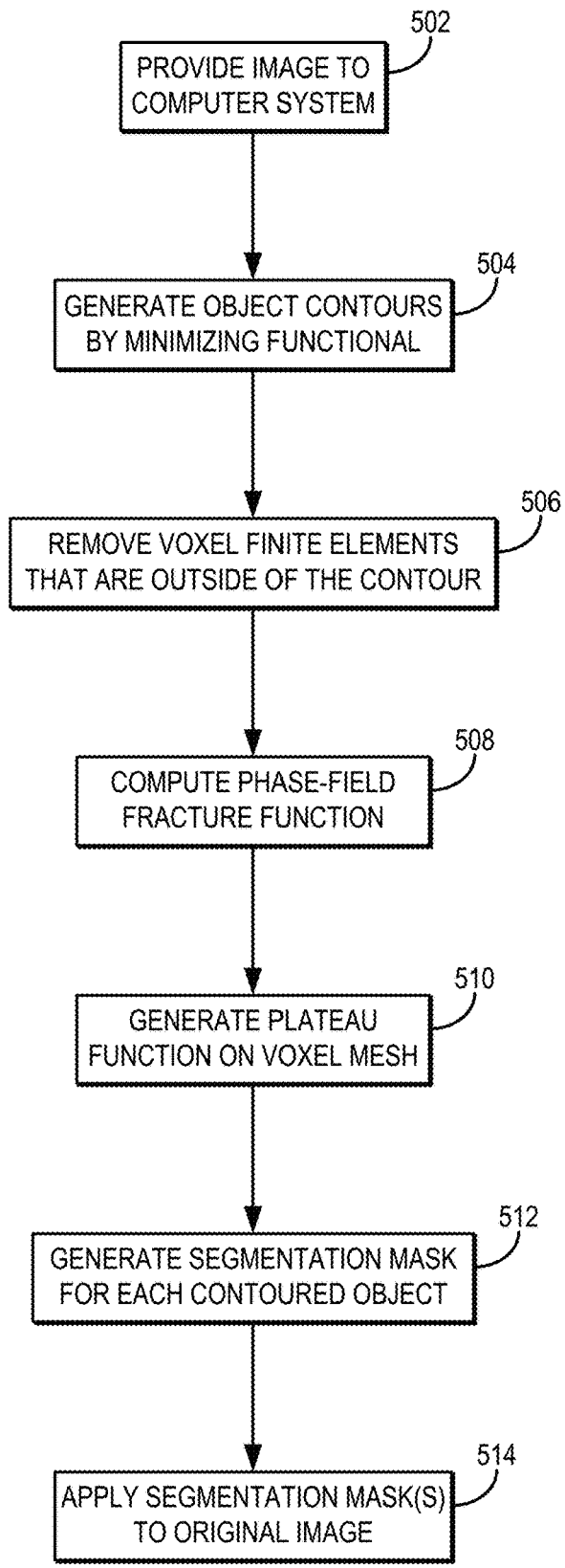
FIG. 5 is a flowchart setting forth the steps of an example method for segmenting an image using a two-stage variational method that incorporates fracture mechanics in the second stage to remove spurious contact bridges connecting object contours generated in the first stage.

Referring now to FIG. 5, a flowchart is illustrated as setting forth the steps of an example method for segmenting an image using a two-stage variational image segmentation that implements fracture mechanics to remove spurious contact bridges between contoured objects.

The method includes providing one or more images to a computer system for segmentation, as indicated at step 502. As noted above, the images can be medical images. The images can be acquired using a CT system, an x-ray imaging system, an MRI system, or other medical imaging system. The images can also be images acquired with an optical imaging system, such as a camera or the like. The images can be two-dimensional images, a stack of contiguous two-dimensional images, or three-dimensional images or image volumes.

After the input image is provided to the computer system, the image is processed to generate an object contour by minimizing an appropriate functional, as indicated at step 504. The object contour can include, for instance, multiple different contours that are connected by contact bridges, which may be fine-scale contact bridges. As one non-limiting example, the object contours can include a first contour and a second contour that are connected by one or more contact bridges. Such an example may be encountered when the first contour corresponds to a first bone object and the second contour corresponds to a second bone object, where the one or more contact bridges overlap with a cartilage region between the bone objects. As one non-limiting example, the bone objects could include the femur and pelvis. As another non-limiting example, the bone objects could include vertebrae.

Figure 6A:
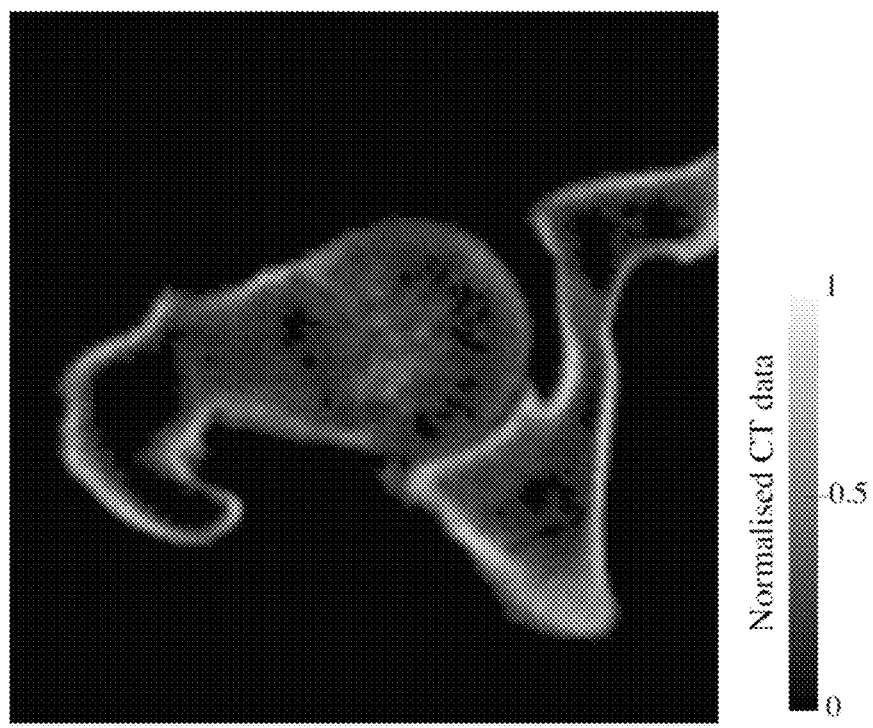
FIG. 6A is an example image generated by rescaling and thresholding the image intensities of the image depicting in FIG. 1B.

In some instances, prior to generating the object contours, the input image can be pre-processed. As one example, the image intensities in the input image can be rescaled to a range, such as the range [0,1]. As another example, the input image could be thresholded. As an example, when segmenting bone objects a global thresholding can be applied in order to set soft tissue information in the image domain to zero. For instance, the input image could be normalized as mentioned and then a threshold of 0.05 can be applied to level soft tissue regions to zero. As an example, FIG. 6A illustrates the image of FIG. 1B after being rescaled and thresholded as described.

The input image can also be non-dimensionalized such that each slice, or region-of-interest ("ROI") within each slice, covers a unit square. A voxel finite element mesh can be generated in space to cover the complete resampled slice or ROI.

As one non-limiting example, the object contour can be generated using a variational image segmentation based on minimizing a functional. For instance, the variational segmentation can be based on an implicit geometric deformable model, such as a Chan-Vese model, which in some instances can be a flux-augmented Chan-Vese model. The minimization can be based on a discretization that uses voxel finite elements in space. First order semi-implicit finite differences in time can also be used. For instance, a semi-implicit finite difference scheme can be solved with a time step of $\Delta t=0.1$, until the difference between the current and previous solution falls below a selected value, such as $10^{-10}$ in the 2-norm. Voxel connectivity can be used to identify the biggest connected network of voxels covered by the nonzero solution. An example of such an approach is described above in detail. As one non-limiting example, the values for the parameters weighting coefficients $\lambda$ and $\mu$ can be selected such that the ratio between $\lambda$ and $\mu$ lies in the range of 0.5-2.

Figure 6B:
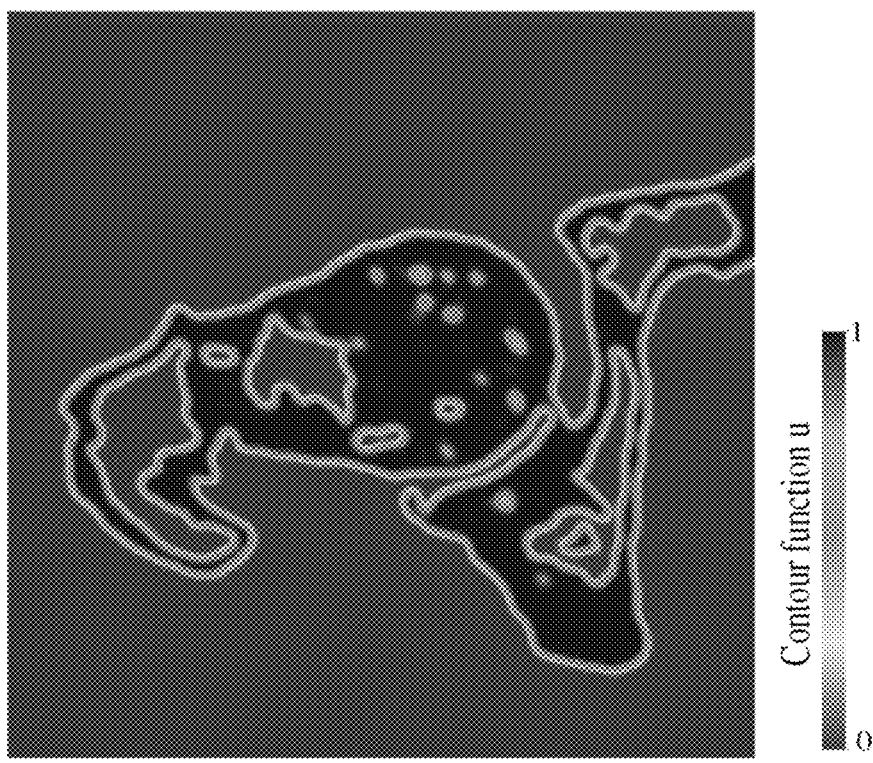
FIG. 6B is an example of an object contour generated from the image in FIG. 6A using an implicit geometric deformable model.

After an object contour is generated the voxel finite elements that lie completely outside the object contour are removed, as indicated at step 506. As an example, the voxel finite elements that lie completely outside an object contour u<0.5 can be removed. Voxel finite elements can also be removed if they lie outside of an isocontour of the contour function, u, other than the u=0.5 isocontour. In some instances, small regions of voxel finite elements that are unconnected to the main object contour can be removed. As an example, an object contour generated from the image of FIG. 1B is shown in FIG. 6B.

Next, a phase-field fracture function is computed based on the voxel finite element mesh, as indicated at step 508. As one example, the phase-field fracture function, c, that is coupled to a Laplace function, h, can be computed by minimizing a potential energy functional, such as the potential energy functional in Eqn. (31). The numerical minimization can include using a staggered algorithm on the voxel finite element mesh.

As described above, the minimization can include a length-scale parameter for the phase field. In some instances, the length-scale parameter can be selected as the same length-scale parameter used in the first stage (e.g., in the Chan-Vese model), such as $l_0=\varepsilon$. As one example, the length-scale parameter can be selected such that the characteristic width of the diffuse boundary contour corresponds to the voxel finite element size.

In some implementations, suitable voxel facets are identified to impose Dirichlet boundary values for the Laplace solution, h, at the boundary of each contoured object. The minimization of the potential energy functional can then be implemented under these Dirichlet constraints. As one example, a staggered algorithm such as the one described above can be used for the minimization problem.

Figure 7A:
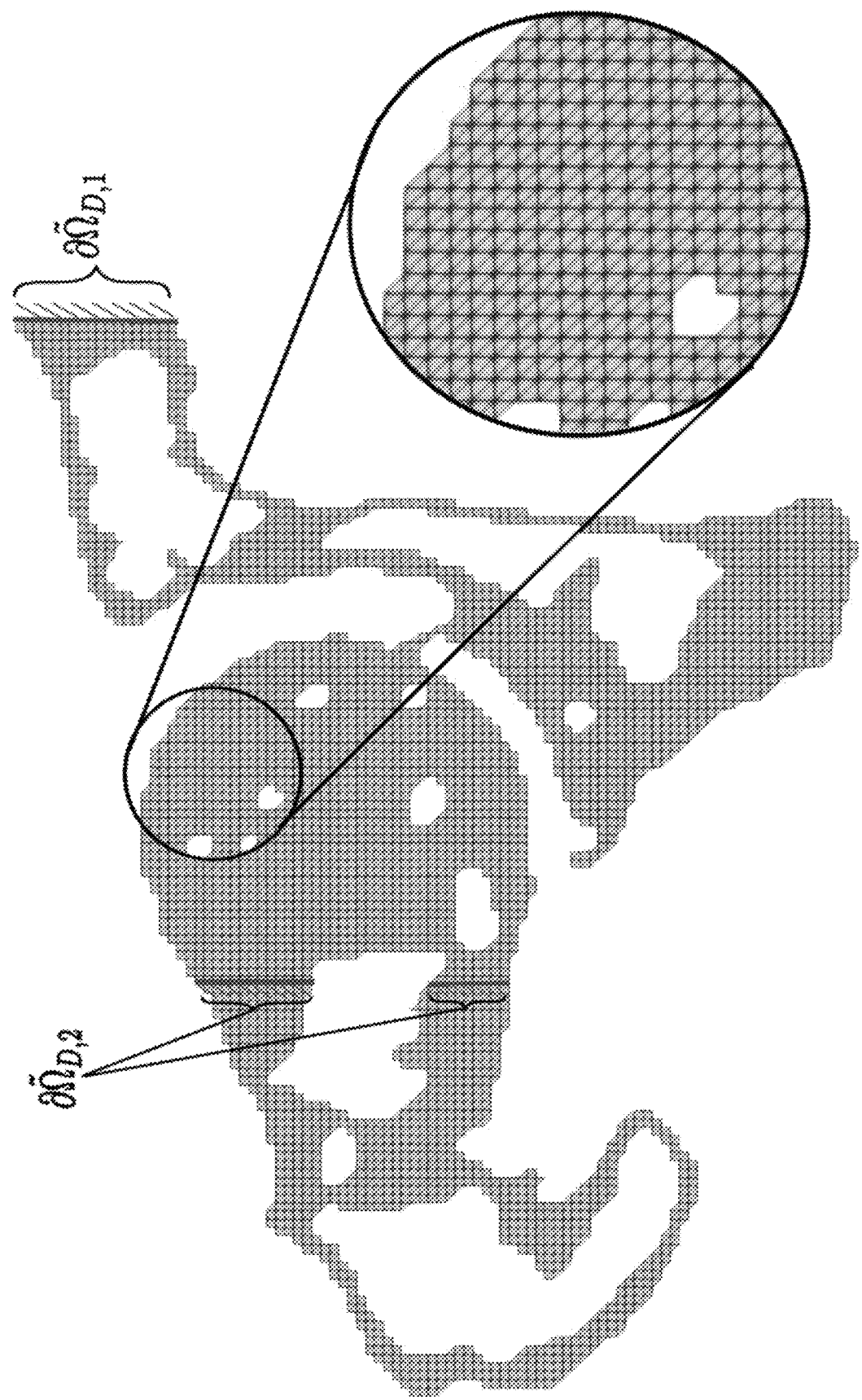
FIG. 7A is an example of a voxel finite element discretization with Dirichlet boundary conditions.
Figure 7B:
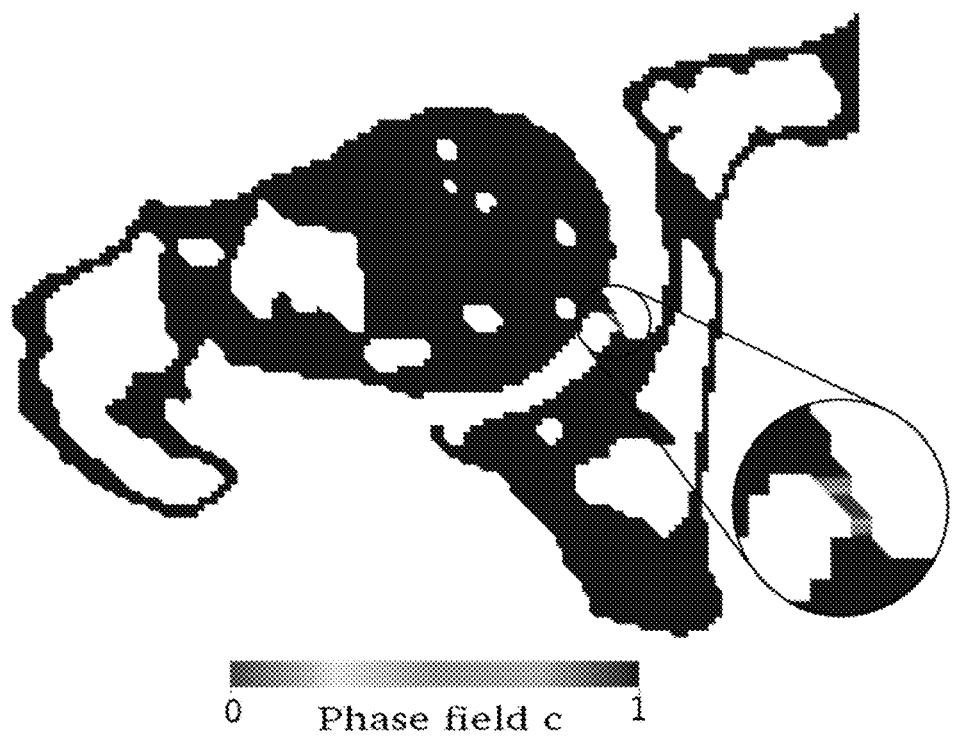
FIG. 7B is an example phase-field fracture function.
Figure 7C:
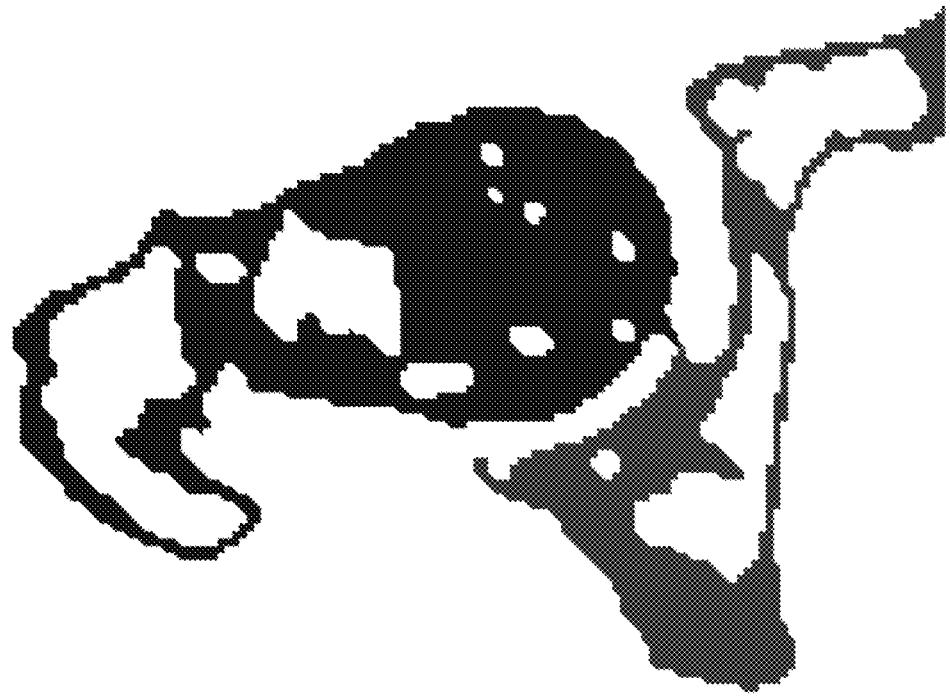
FIG. 7C is an example Laplace solution field.

FIG. 7A shows an example of a voxel finite element discretization of the domain, $\tilde{\Omega}$, including Dirichlet constraints, that can be generated from the object contour shown in FIG. 6B. FIGS. 7B and 7C show example of the coupled phase-field and Laplace solution fields computed in this example. In particular, FIG. 7B shows the phase-field fracture solution, c, and FIG. 7C shows the Laplace solution field, h.

Figure 8A:
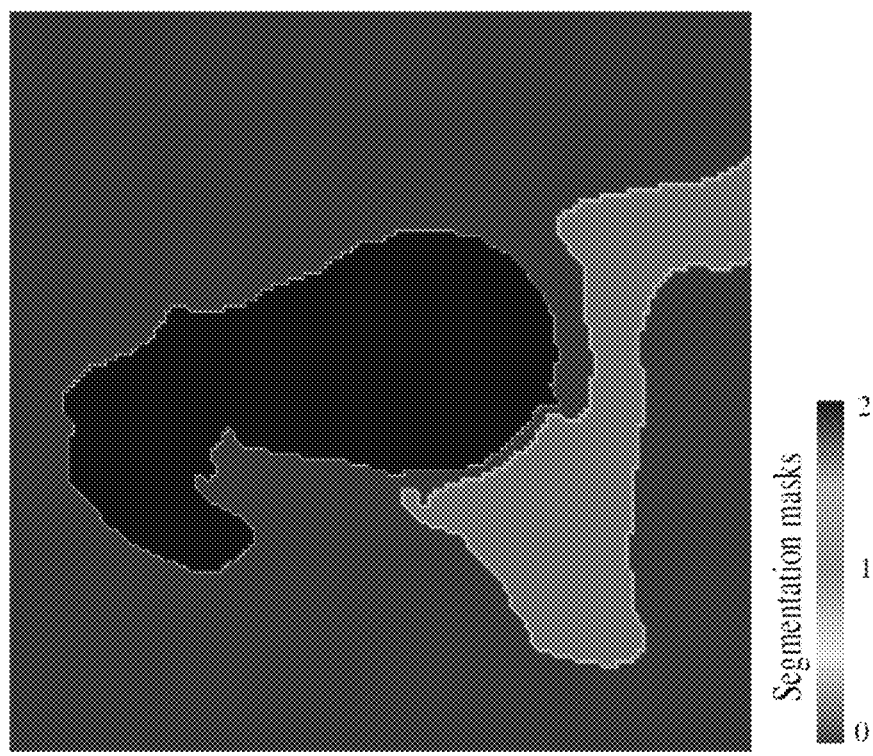
FIG. 8A is an example of segmentation masks generated from the phase-field fracture function and Laplace solution field of FIGS. 7B and 7C, respectively.

A plateau function, $c(x) \cdot h(x)$, is generated on the voxel mesh using the coupled phase-field fracture function and Laplace solution, as indicated at step 510. A standard dilation filter, a standard filling algorithm, and erosion filter can be used to fill potential voids in the object interior. The plateau function is then used to generate segmentation masks for each contoured object, as indicated at step 512. For instance, a segmentation mask can be generated by zeroing voxels where h=1. An example of two segmentation masks generated using the coupled solutions in FIGS. 7B and 7C are shown in FIG. 8A.

Figure 8B:
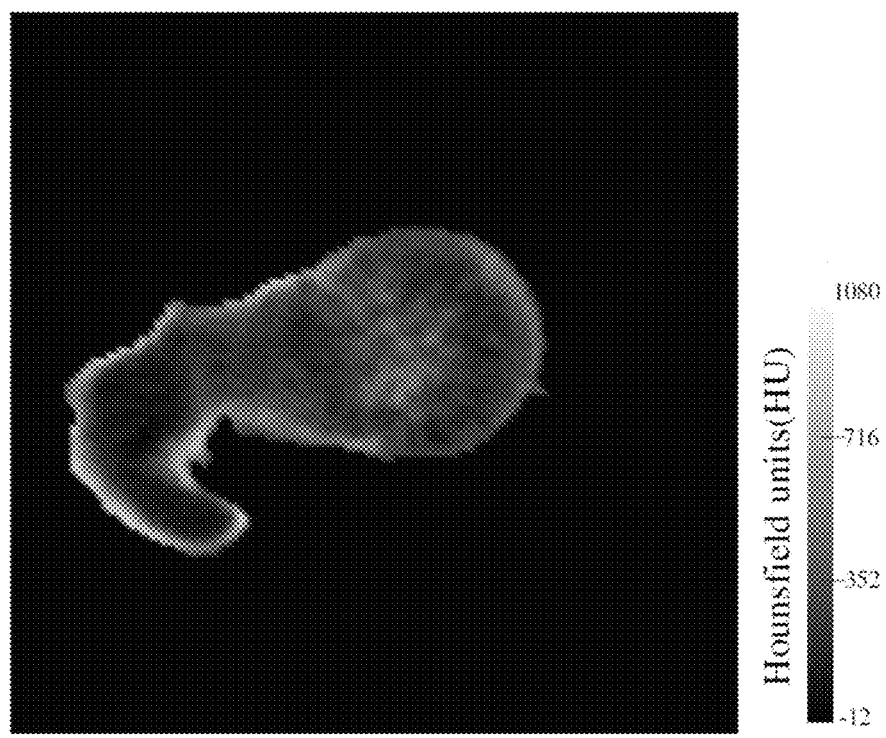
FIG. 8B is an example of a segmented image generated by applying one of the segmentation masks of FIG. 8A to the image of FIG. 1B.

The segmentation masks are then used to segment the input image, as indicated at step 514. For instance, the input image can be masked voxel-wise by multiplying the input image with a segmentation mask to generate a segmentation of the object associated with the segmentation mask. An example of applying one of the segmentation masks of FIG. 8A to the image of FIG. 1B is shown in FIG. 8B.

As mentioned above, the methods described in the present disclosure can be used to segment bone objects in CT or other medical images, such as segmenting the femur. Segmenting the femur from 3D CT data is an important task in clinical practice and biomedical research. For example, it can be useful to visually assess bone quality and multi-scale fractures, or as a basis for running physiology-based finite element simulations. It can be difficult to reliably segment the femur in 3D CT data because accurate separation of the femur from neighboring bones, in particular from the pelvic bone, is challenging based on the presence of cartilage in the joint. Particularly, the femoral head meets the pelvis at the acetabulum, forming the hip joint. Their surfaces are separated by a thin layer of articular cartilage that can be difficult to reliably separate from the adjacent bone objects.

The methods described in the present disclosure can also be used for segmenting other bone objects, such as vertebral bones. Clinical diagnosis and therapy of spine related diseases requires knowledge of stress and strains in particular vertebra regions. An important task in clinical practice and biomedical applications is, therefore, to extract a segmentation of an individual vertebra from 3D CT data, or other medical imaging, of the spine. It can be difficult to reliably separate the target vertebra bone from the neighboring upper and lower vertebrae because, although neighboring vertebral bodies do not touch each other directly, they are separated by an intervertebral disk that forms a thin intervertebral fibro-cartilage layer. In addition, some of the spinous processes of neighboring vertebrae form synovial joints that contain thin fibrous capsules of cartilage material. In clinical CT scans, these cartilage regions are usually resolved only by a few voxels, which makes detection and bone separation difficult.

Using the methods described in the present disclosure, however, vertebra can be reliably segmented. In particular, the two-stage segmentation, including a phase-field fracture stage, can be used to eliminate connections between the vertebrae. As one example implementation, when segmenting a central vertebra from its upper and lower neighbors, voxel finite elements from the discretization that are completely outside the contour u<0.5 can be removed. The Dirichlet constraints on the Laplace solution, h, in this example can be applied as follows. At the middle plane of the ROI, h=2 can be used because this plane lies completely within the target center vertebra. The lower and upper vertebrae touch the lower and upper boundaries of the voxel finite element discretization, where the boundary conditions h=1 and h=3 can be applied. The minimizer, {c,h}, of the potential energy functional under the applied Dirichlet constraints can then be found, such as via the staggered algorithm described above.

Figure 9:
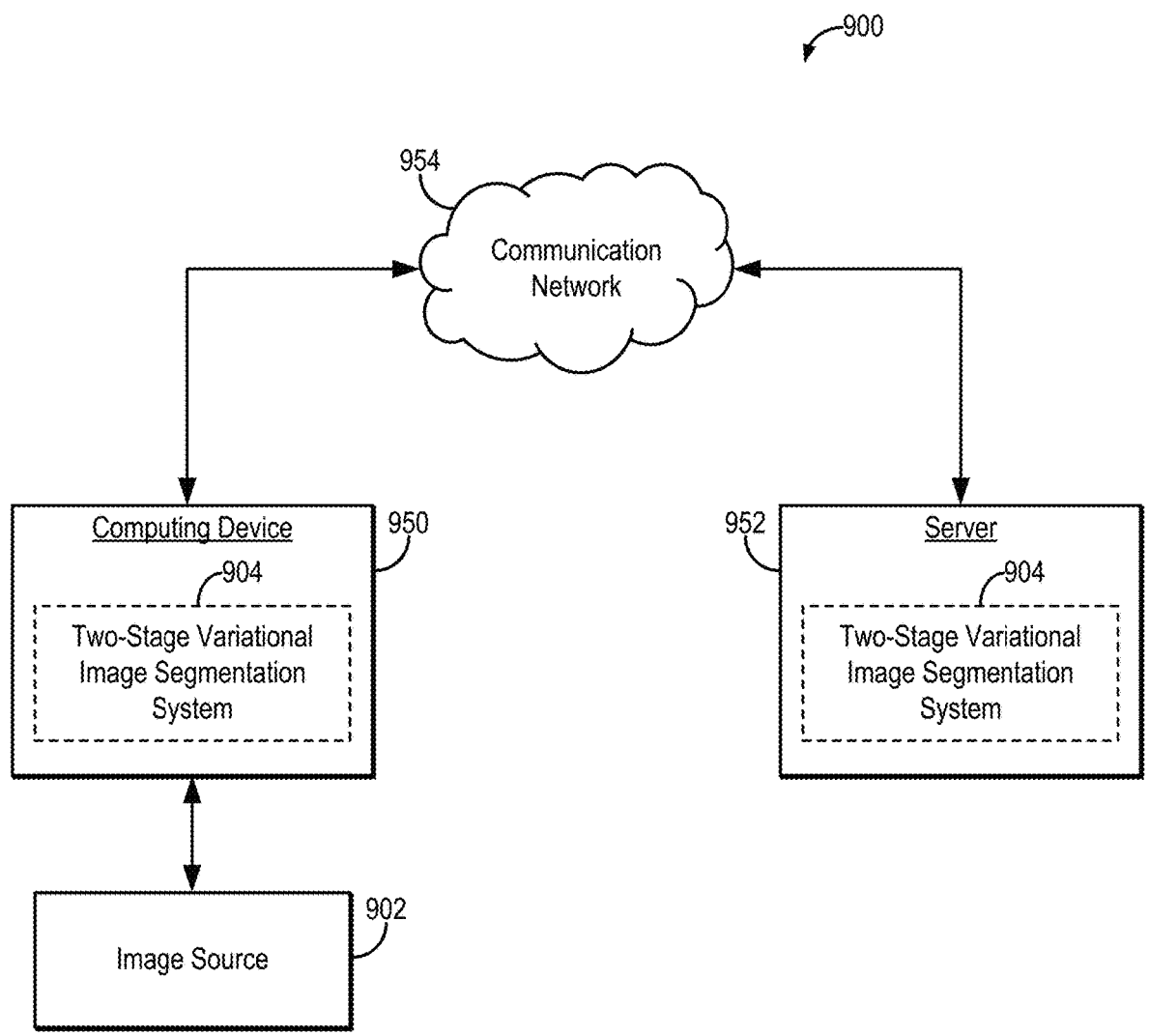
FIG. 9 is a block diagram of an example image segmentation system that can implement the methods described in the present disclosure.

Referring now to FIG. 9, an example of a system 900 for segmenting medical images in accordance with some embodiments of the systems and methods described in the present disclosure is shown. As shown in FIG. 9, a computing device 950 can receive one or more types of data (e.g., medical image data) from image source 902, which may be a medical image source. In some embodiments, computing device 950 can execute at least a portion of a two-stage variational image segmentation system 904 to generate segmented medical images from the medical image data received from the image source 902.

Additionally or alternatively, in some embodiments, the computing device 950 can communicate information about data received from the image source 902 to a server 952 over a communication network 954, which can execute at least a portion of the two-stage variational image segmentation system 904. In such embodiments, the server 952 can return information to the computing device 950 (and/or any other suitable computing device) indicative of an output of the two-stage variational image segmentation system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, image source 902 can be any suitable source of image data (e.g., measurement data, images reconstructed from measurement data), such as a CT system, an MRI system, another computing device (e.g., a server storing image data), and so on. In some embodiments, image source 902 can be local to computing device 950. For example, image source 902 can be incorporated with computing device 950 (e.g., computing device 950 can be configured as part of a device for capturing, scanning, and/or storing images). As another example, image source 902 can be connected to computing device 950 by a cable, a direct wireless link, and so on. Additionally or alternatively, in some embodiments, image source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 9 can each be any suitable communications link or combination of communications links, such as wired links, fiber optic links, Wi-Fi links, Bluetooth links, cellular links, and so on.

Figure 10:
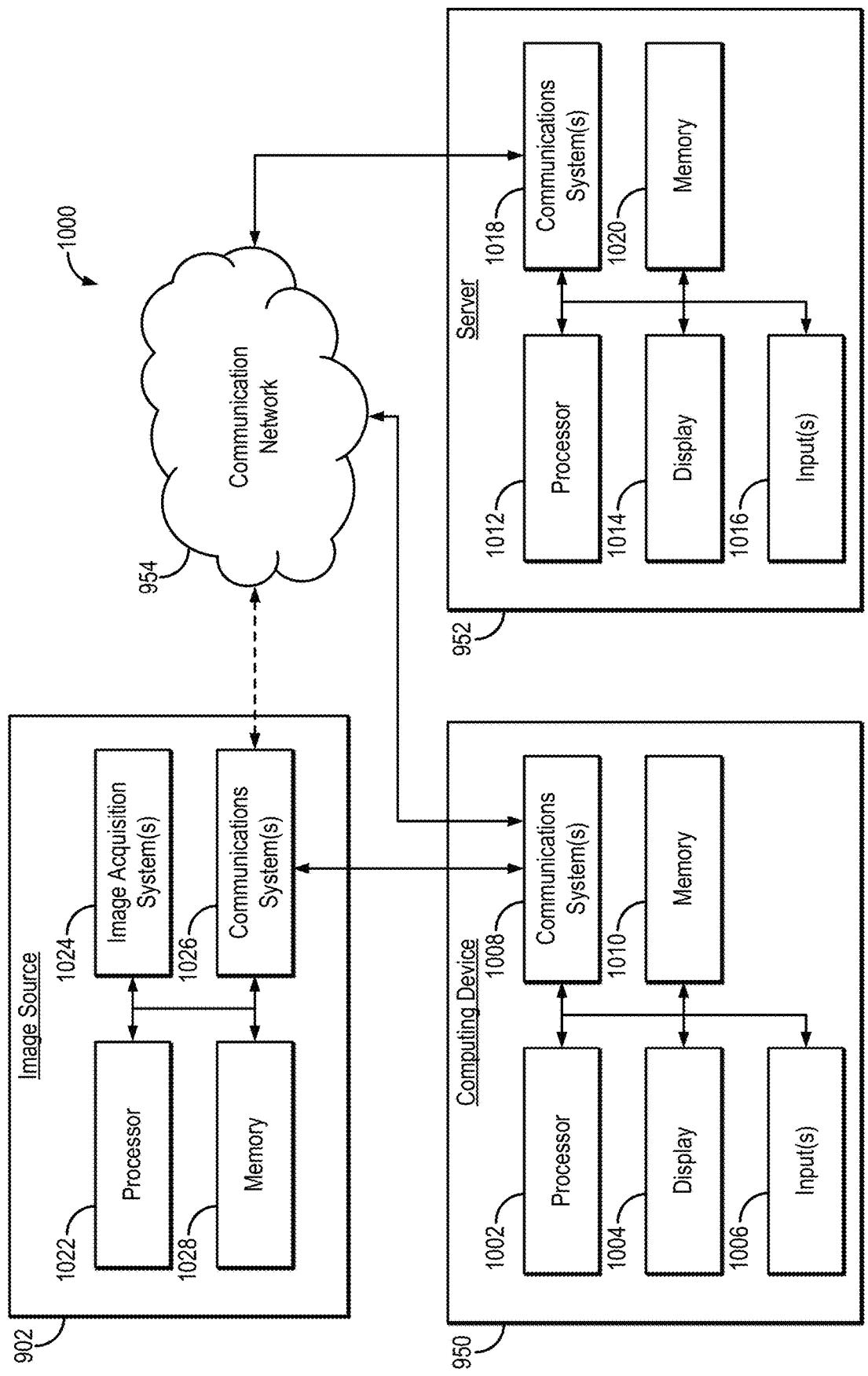
FIG. 10 is a block diagram of example components that can implement the system of FIG. 9.

Referring now to FIG. 10, an example of hardware 1000 that can be used to implement image source 902, computing device 950, and server 952 in accordance with some embodiments of the systems and methods described in the present disclosure is shown. As shown in FIG. 10, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include RAM, ROM, EEPROM, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on.

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware and/or software that can be used to establish a Wi-Fi connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EEPROM, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, image source 902 can include a processor 1022, one or more image acquisition systems 1024, one or more communications systems 1026, and/or memory 1028. In some embodiments, processor 1022 can be any suitable hardware processor or combination of processors, such as a CPU, a GPU, and so on. In some embodiments, the one or more image acquisition systems 1024 are generally configured to acquire data, images, or both, and can include a CT system, an MRI system, or another suitable medical imaging system. Additionally or alternatively, in some embodiments, one or more image acquisition systems 1024 can include any suitable hardware, firmware, and/or software for coupling to and/or controlling operations of a CT system, an MRI system, or other suitable medical imaging system. In some embodiments, one or more portions of the one or more image acquisition systems 1024 can be removable and/or replaceable.

Note that, although not shown, image source 902 can include any suitable inputs and/or outputs. For example, image source 902 can include input devices and/or sensors that can be used to receive user input, such as a keyboard, a mouse, a touchscreen, a microphone, a trackpad, a trackball, and so on. As another example, image source 902 can include any suitable display devices, such as a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more image acquisition systems 1024, and/or receive data from the one or more image acquisition systems 1024; to images from data; present content (e.g., images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EEPROM, one or more flash drives, one or more hard disks, one or more solid state drives, one or more optical drives, and so on. In some embodiments, memory 1028 can have encoded thereon, or otherwise stored therein, a program for controlling operation of image source 902. In such embodiments, processor 1022 can execute at least a portion of the program to generate images, transmit information and/or content (e.g., data, images) to one or more computing devices 950, receive information and/or content from one or more computing devices 950, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for segmenting a medical image, the steps of the method comprising:
   (a) providing a medical image to a computer system;
   (b) generating an object contour having a first contour and a second contour, connected by at least one contact bridge by minimizing a functional based in part on an implicit geometric deformable model, wherein the medical image is input to the functional;
   (c) computing a phase-field fracture function that removes the at least one contact bridge to separate the first contour and the second contour by minimizing an energy functional, wherein the object contour is input to the energy functional;

(d) generating a segmentation mask using the phase-field fracture function;

(f) producing a segmented image that depicts the object by applying the segmentation mask to the medical image.

2. The method as recited in claim 1, step (c) includes generating a voxel finite element mesh using the medical image and the object contour, and wherein the phase-field fracture function is computed on voxel finite element mesh.

3. The method as recited in claim 2, wherein the voxel finite element mesh includes one of triangular, quadrilateral, tetrahedral, or hexahedral voxel finite elements.

4. The method as recited in claim 2, wherein generating the voxel finite element mesh includes removing voxel finite elements that lie outside of the object contour.

5. The method as recited in claim 1, wherein step (c) includes computing a coupled phase-field fracture function and Laplace solution field.

6. The method as recited in claim 5, wherein step (c) includes minimizing the energy functional using boundary constraints.

7. The method as recited in claim 6, wherein the boundary constraints are Dirichlet constraints.

8. The method as recited in claim 5, wherein step (d) includes computing a plateau function by multiplying the phase-field fracture function and the Laplace solution field and generating the segmentation mask based on the plateau function.

9. The method as recited in claim 1, wherein the functional minimized in step (b) is a Chan-Vese functional.

10. The method as recited in claim 9, wherein the Chan-Vese functional is a flux-augmented Chan-Vese functional.

11. The method as recited in claim 1, wherein step (a) includes rescaling the medical image to a range of image intensity values.

12. The method as recited in claim 11, wherein the range of image intensity values is zero to one.

13. The method as recited in claim 1, wherein step (a) includes thresholding the medical image to reduce image intensities associated with soft tissues.

14. The method as recited in claim 1, wherein the medical image is an image obtained with a computed tomography system.

15. The method as recited in claim 1, wherein the object contour separates a first bone object associated with the first contour and a second bone object associated with the second contour from surrounding soft tissues, and wherein the at least one contact bridge exists in a cartilage region between the first bone object and the second bone object.

16. The method as recited in claim 15, wherein the first bone object is a femur and the second bone object is a pelvis.

17. The method as recited in claim 15, wherein the first bone object is a first vertebra and the second bone object is a second vertebra.

* * * * *